Figure 1:
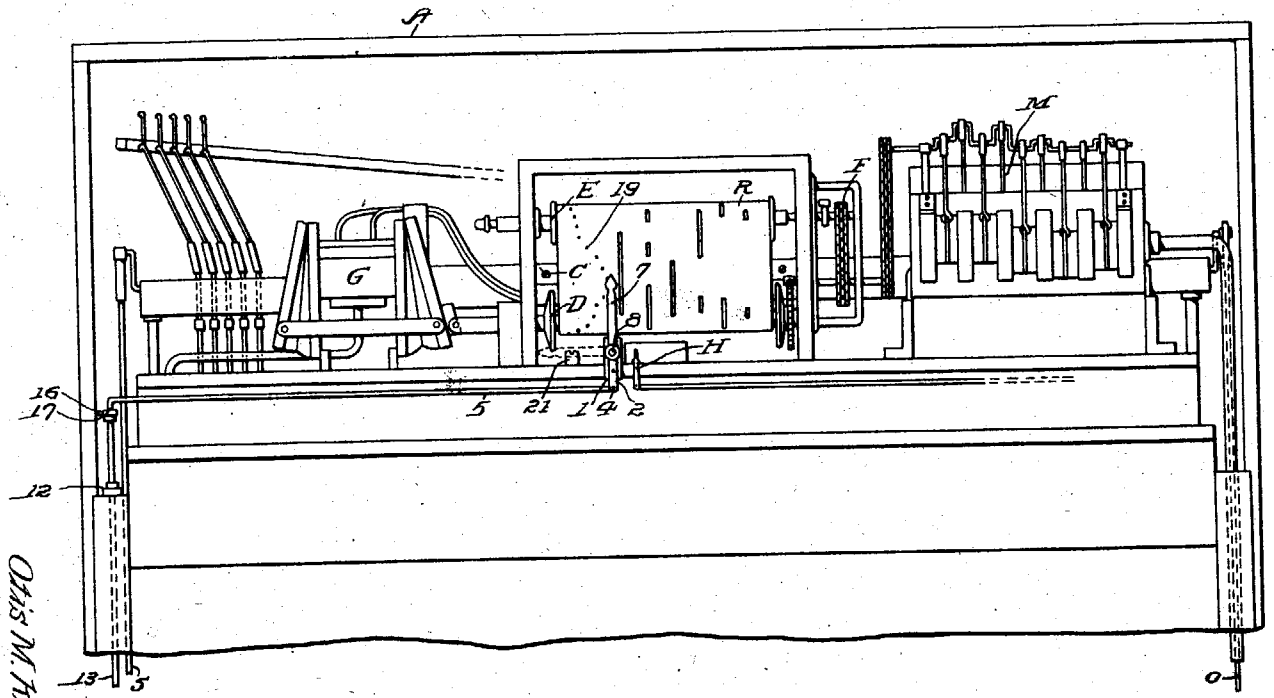

O. M. KENNEDY.

EXPRESSION CONTROLLING DEVICE FOR PLAYER PIANOS.

APPLICATION FILED MAY 15, 1918.

Reissued June 24, 1919.

14,672.

4 SHEETS—SHEET 1.

INVENTOR

Otis M. Kennedy.

WITNESS

W. J. Hartman.

BY

Fritz Blount,

ATTORNEYS

THE NORRIS PETERS CO., PHOTO-LITHO., WASHINGTON, D. C.

O. M. KENNEDY.

EXPRESSION CONTROLLING DEVICE FOR PLAYER PIANOS.

APPLICATION FILED MAY 15, 1918.

Reissued June 24, 1919.

14,672.

4 SHEETS—SHEET 2.

INVENTOR

Otis M. Kennedy.

Fenton & Blount,

ATTORNEYS

WITNESS

F. J. Hartman.

BY

THE NORRIS PETERS CO., PHOTO-LITHO., WASHINGTON, D. C.

O. M. KENNEDY.
EXPRESSION CONTROLLING DEVICE FOR PLAYER PIANOS.
APPLICATION FILED MAY 15, 1918.
Reissued June 24, 1919.
14,672.
4 SHEETS—SHEET 3.
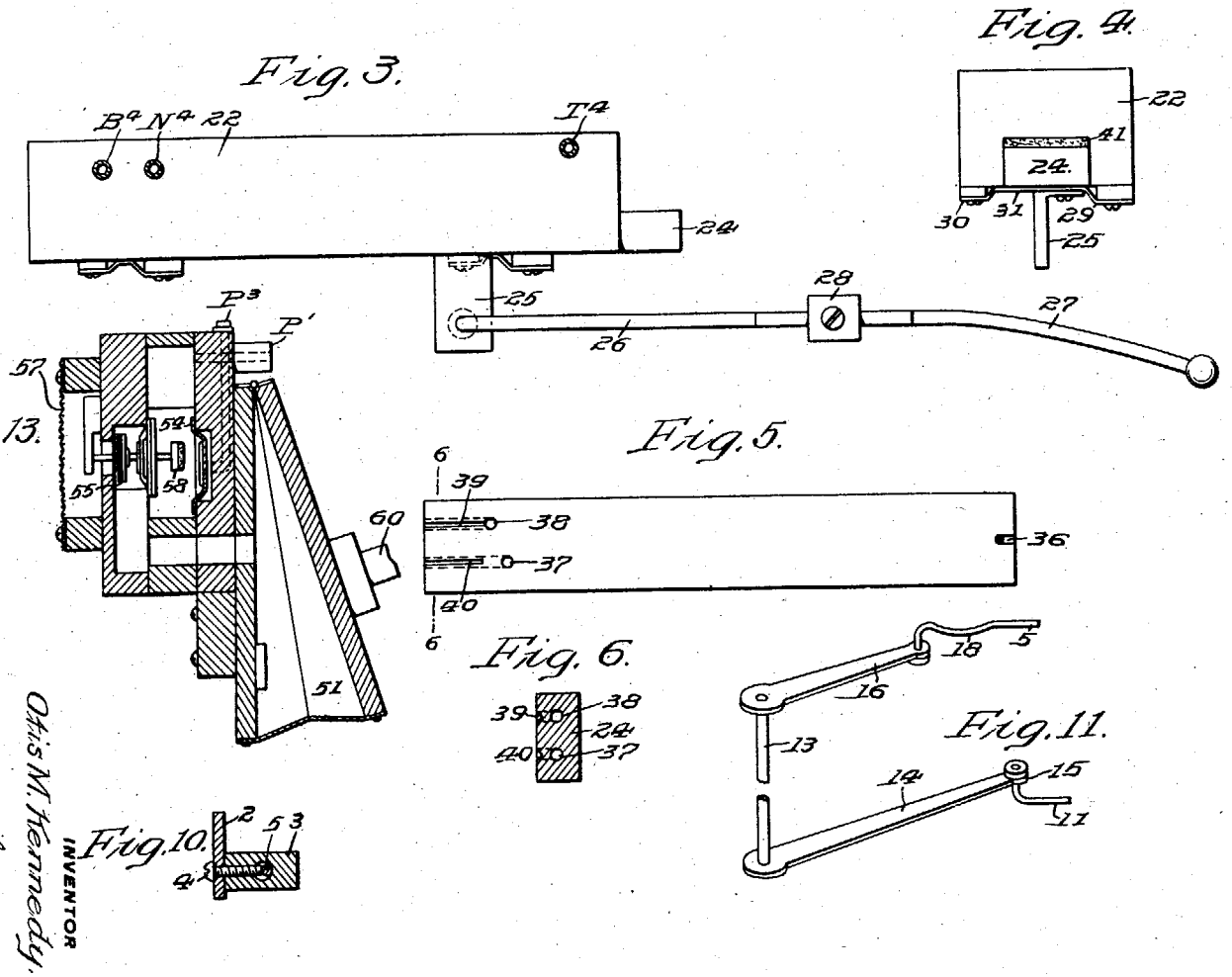
WITNESS
F. J. Hartman.
INVENTOR
Otis M. Kennedy.
BY
Fraser & Blount
ATTORNEYS
THE NORRIS PETERS CO., PHOTO-LITHO., WASHINGTON, D. C.

O. M. KENNEDY.
EXPRESSION CONTROLLING DEVICE FOR PLAYER PIANOS.
APPLICATION FILED MAY 15, 1918.
Reissued June 24, 1919.
14,672.
4 SHEETS—SHEET 4.
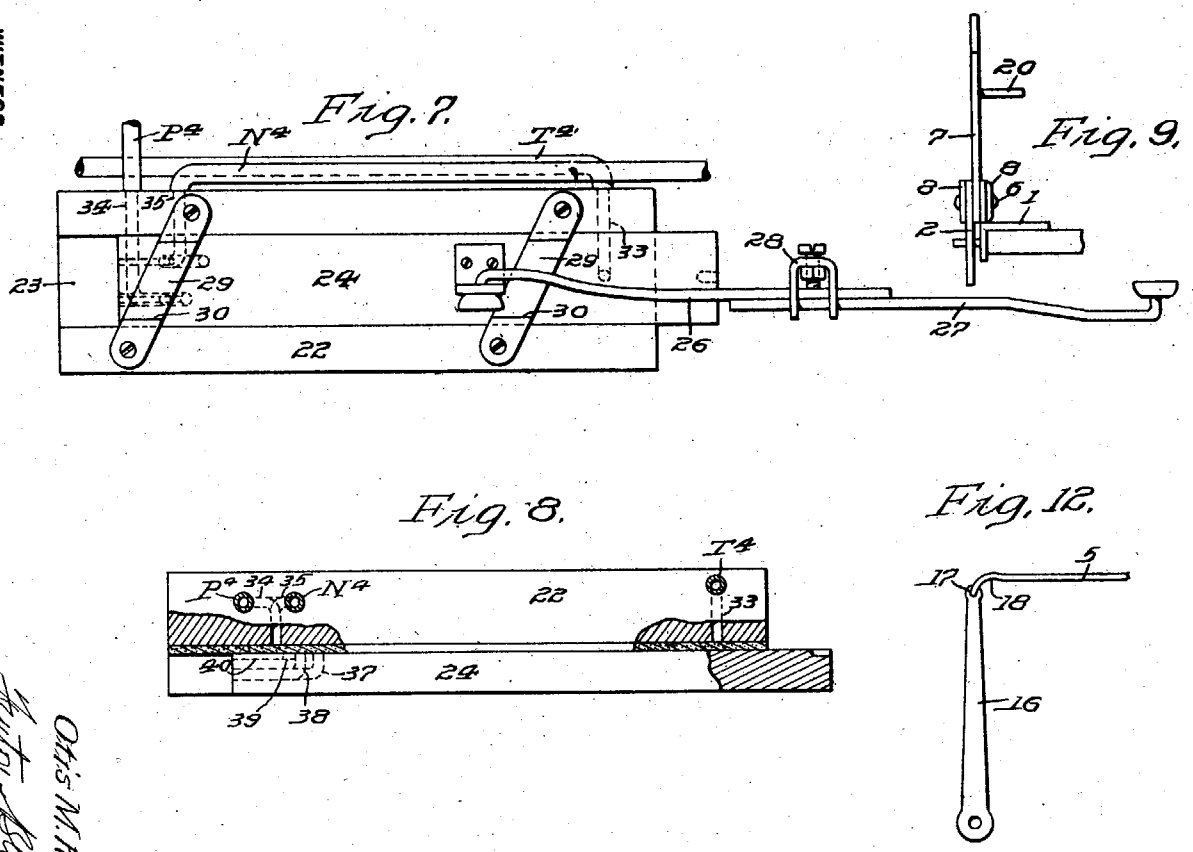
WITNESS
F. J. Hartman.
INVENTOR
Otis M. Kennedy.
Fenton & Blount,
BY
ATTORNEYS
THE NORRIS PETERS CO., PHOTO-LITHO., WASHINGTON, D. C.

UNITED STATES PATENT OFFICE.

OTIS M. KENNEDY, OF PHILADELPHIA, PENNSYLVANIA, ASSIGNOR TO THE CUNNINGHAM PIANO COMPANY OF PHILADELPHIA, OF PHILADELPHIA, PENNSYLVANIA, A CORPORATION OF PENNSYLVANIA.

EXPRESSION-CONTROLLING DEVICE FOR PLAYER-PIANOS.

14,672. Specification of Reissued Letters Patent. Reissued June 24, 1919.

Original No. 1,183,569, dated May 16, 1916, Serial No. 38,526, filed July 7, 1915. Application for reissue filed May 15, 1918. Serial No. 234,797.

*To all whom it may concern:*

Be it known that I, OTIS M. KENNEDY, a citizen of the United States, residing at Philadelphia, in the county of Philadelphia and State of Pennsylvania, have invented new and useful Improvements in Expression-Controlling Devices for Player-Pianos, of which the following is a specification.

This invention relates to new and useful improvements in pneumatic players and more particularly to the mechanism for actuating and governing the expression instrumentalities in a pneumatic player, including indicating means therefor, to give the desired expression to the music.

Generally, on music sheets of the standard type for player pianos there is provided on each of the same, a longitudinally disposed sinuous line called the expression line designed to indicate to the performer the appropriate actuation of the controller mechanisms necessary to produce the expression effects intended to be given to the music recorded by the perforations on the sheet. Prior to my invention these expression effects were produced by separate and operatively non-related instrumentalities each actuated and operating separately, and there was no adequate means to actuate an indicating device to follow the courses of the indicating line to coöperate with the appropriate actuation of such expression controlling instrumentalities.

My invention has for its object to provide a unitary means controlling at the will of the operator, the actuation of each and all of said expression effecting instrumentalities, through a single manually operated mechanism, and an effective indicator device, actuated by and with such means, and adapted to follow the line on the music roll; whereby the appropriate expression effect or effects indicated by said line may be produced by the several corresponding expression controlling instrumentalities actuated through a single source of manual control; and whereby the standard music roll with the usual expression line thereon is made fully effective.

The invention also aims to provide a device of the character described which can be retained in a neutral position whereby the expression may be obtained in the ordinary manner.

To these ends the invention consists in the improved construction and novel arrangements, formation and combination of parts, which will be hereinafter fully described and particularly pointed out in the appended claims.

In the accompanying drawings has been illustrated a simple and preferred form of the invention, it being, however, understood that no limitation is necessarily made to the precise structural details therein exhibited, but that the right is reserved to any changes, alterations and modifications to which recourse may be had within the scope of the invention and without departing from the spirit or sacrificing the efficiency of the same.

Figure 2:
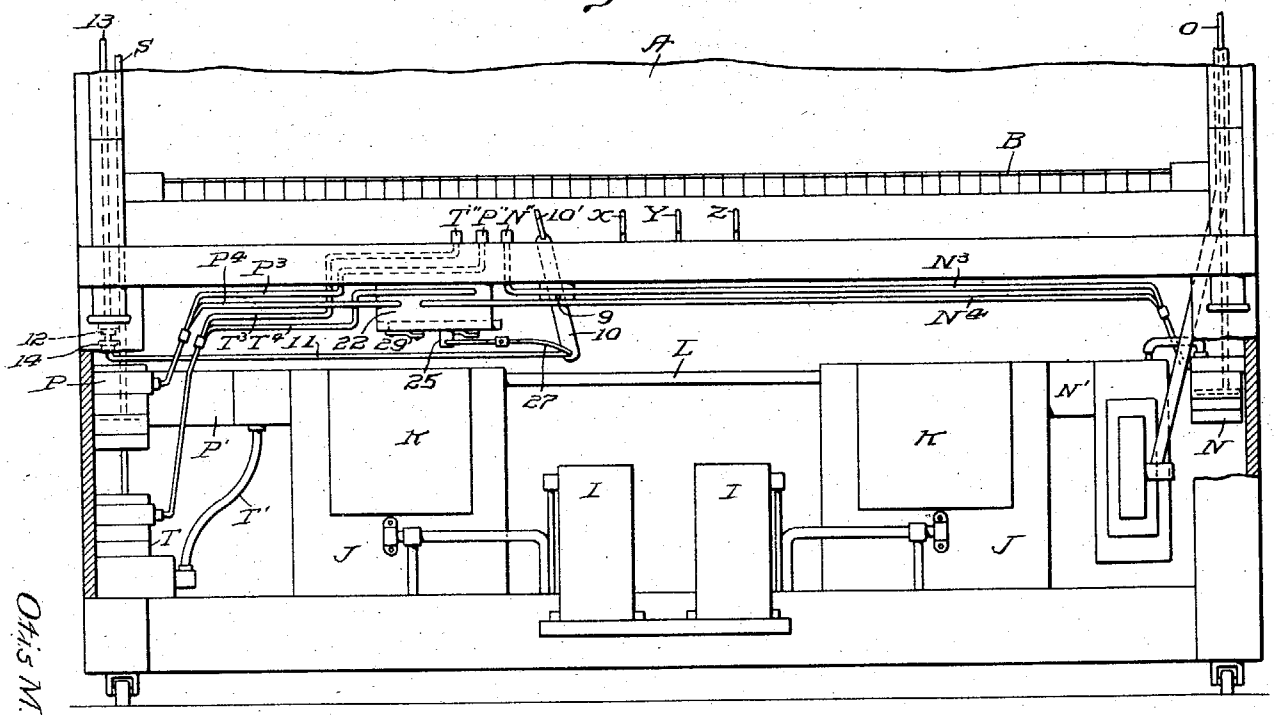

In the drawings; Figure 1 is a fragmental front elevation of an upright piano showing a portion of the pneumatic player and having one embodiment of the present invention applied thereto. Fig. 2 is a similar view showing the lower portion of the piano and player with a portion of the invention applied thereto. Fig. 3 is an enlarged side elevation of valve for controlling the action of the solo or expression controlling pneumatics. Fig. 4 is an end elevation of the same. Fig. 5 is a top plan view of the slide valve when removed. Fig. 6 is a vertical section taken on the line 6—6 of Fig. 5. Fig. 7 is a bottom plan view of the valve when removed. Fig. 8 is a horizontal section of the same. Fig. 9 is a side elevation of the indicator as applied to the music spool box. Fig. 10 is a detail sectional view of the lever connected to the indicator. Fig. 11 is a detail perspective view of the upper and lower crank arms, and Fig. 12 is a plan view of the upper crank arm. Fig. 13 is a vertical section through one of the pneumatics.

Like and corresponding parts are indicated by similar reference characters throughout.

The letter A indicates an upright piano of any well known or approved construction having the key board *b* and the key bed B as usual.

The parts of the player not directly forming a part of the present invention do not need a complete description herein. I have chosen to show only such parts as are directly correlated with the elements forming the subject matter herein claimed and such parts will be referred to only as briefly as will be necessary to a proper understanding of the construction and operation of the parts constituting the present invention which will be readily apparent to those skilled within the art.

The pneumatic player as herein shown has the usual tracker board C; a music roll E; a take up roll D, a perforated sheet of music unwinding from the roller D upon the roller E and vice versa.

A pneumatic motor M is shown operatively connected to the driving mechanism F of any approved type and the latter is operatively connected to one of the rollers E and D for driving the same.

G indicates the usual automatic self tracker and H the usual tempo indicator.

In Fig. 2 of the drawings the treadles I are shown for operating the feeds J, and the reservoirs K being connected by the tube L.

The letter N indicates the usual treble solo pneumatic having the vertically extending rod O connected at one end thereto and the opposite end of the rod being connected to the hammer rail in the usual manner. The treble solo pneumatic is in communication with the feeders by means of the tube N′.

Arranged within the opposite side of the piano casing is the bass pedal pneumatic P, being in communication with the feeders by the usual tube P′, and this solo pneumatic is operatively connected to the hammer rail by means of the rod S.

The letter T indicates the loud pedal pneumatic being in communication with the feeders by means of the tube T′ and this pedal pneumatic is operatively connected to the hammer rail as usual.

Each of the pneumatics N, P and T, comprise mechanism when brought in communication with the atmosphere will be caused to operate and when operated this mechanism will operate the hammer rest rails of the piano mechanism as is common in all pneumatic player pianos and a detail description of the operation of this mechanism is thought to be unnecessary as such is common and known to those skilled within the art. In Fig. 13 there is shown a section through one of the pneumatics and as all of the pneumatics are of the same construction, I will give a detail description of only one of them. This pneumatic, as shown, is a representation of the conventional form now used in many pneumatic player pianos, and it is to be understood that any common or well known pneumatic may be substituted therefor which will give the desired results as no claim is being made to the specific construction of the pneumatic as shown.

The pneumatic P comprises a pouch 54 in the exhaust chamber which is connected to the operating button P″ by means of the rubber tube $P^3$ and this exhaust chamber is connected to the wind chest or feeders by means of the tube P′. By pressing the button P″ air is permitted to enter the tube $P^3$ and then under the pouch 54 causing the latter to strike the valve button 58, thereby holding the valve 55 against its valve seat. A felt cover 57 is provided which permits air to enter into the passage way 52 when the valve 55 is opened, and then into the pneumatic 51, but when the valve 55 is closed the supply of air to the pneumatic 51 is cut off and a vacuum is formed within the pneumatic thereby causing the pneumatic to move the arm 60 which is connected to the hammer rail of the piano mechanism. When the button P″ is allowed to come back to its normal position it shuts off air from under the pouch 54, thereby releasing valve 55 and permitting air again to enter the pneumatic by the passage way 52.

Mounted within the key-bed of the piano are the buttons N″, P″ and T″ for operating the usual valves for permitting air to enter the tubes $N^3$, $P^3$ and $T^3$ leading to the respective solo pneumatics, whereby they will be operated for obtaining the expression to the music as usual.

The levers X, Y and Z are the usual levers for operating the tempo indicator, and the motor for winding and unwinding the music rolls as usual.

All of the foregoing parts described go to make up the player action of a pneumatic piano now in use and form no part of the present invention.

As stated in the outset of the specification, it was an object of the invention to provide means for operatively combining and actuating, through a single manually operable device, the several expression-controlling instrumentalities, to give the required expression to the music produced by the player piano of this type and this mechanism will be described as follows:

Mounted upon the music spool box is a bracket 1 having fulcrumed thereto a lever 2. The lower end of the lever is connected to a block 3, see Fig. 10, by means of the set screw 4. Extending through the aperture formed within the block is a rod 5 and this rod is retained within the aperture by means of the set screw. By loosening the set screw the rod may be released thereby forming an adjustable connection between the rod and the lever. Pivotally connected to the lever 2, as at 6, is an indicator arm 7. Mounted on each side of the indicator arm and the lever are leather disks 8 thereby providing a frictional connection for permitting the indicator to swing upon its pivot and when the lever is operated the indicator will be carried therewith.

Secured to the key-bed is a bearing 9 having an operator's lever 10 pivotally secured thereto and this lever is connected at one end of a horizontally arranged link 11. Bearings 12 are mounted upon the piano casing and have journaled therein a vertically extending shaft 13. Secured to the lower end of the shaft 13 is a crank arm 14 having pivotally connected thereto, as at 15, one end of the rod 11. The opposite end of the shaft is provided with a crank arm 16 having pivoted thereto, as at 17, the rod 5. This rod 5 is provided with an offset portion 18 so that it may extend around the casing inclosing part of the player action (see Fig. 11) and prevent an interference with its operation. The lower crank arm 14 is greater in length than the upper crank arm 16, but both of these crank arms extend from the shaft 13 in parallel relation to each other, as better shown in Fig. 11 of the drawings.

From the foregoing it is obvious that by moving the lever 10 upon its pivot the lever 2 will also be swung upon its pivot connection through the mechanism as described.

Many standard music rolls now in use are provided with a sinuous line 19, such as shown in Patent 452203 to Webber and 622260 to Poole, as a directional guide to the operator how and when to operate the several controller levers of the instrument, actuating the respective expression controlling instrumentalities.

The lever 2 being connected to the indicator, the latter will also move when the lever 10 is operated so that the operator when moving the lever 10 will cause the indicator to follow the expression line upon the music rolls.

When it is not desired to use the expression mechanism, the indicator may be swung upon its pivot connection 6 and the stop 20 carried thereby may rest within the neutral bracket 21 as indicated by dotted lines in Fig. 1.

Secured to the piano casing is a valve casing 22 having a channel 23 formed therein in which is slidably mounted a valve 24. A bracket 25 is secured to the outer face of the slide valve 24 and pivotally connected to the bracket is a rod 26. Another rod 27 is pivotally connected to the lower end of the lever 10 and the inner ends of these rods 26 and 27 are adjustably connected by means of the connection 28.

A pair of leaf springs 29 are diagonally secured to the valve casing 22 by means of screws and these springs are provided with offset portions 30 which rest upon the lower face of the slide valve 24 for retaining the same within the channel way.

Connected to the tubes of the several expression pneumatics are the tubes $N^4$, $P^4$ and $T^4$ respectively. The tube $T^4$ leads to the valve casing 22 and is in communication with the passage way 33 leading to the channel way 23 at one end thereof. The tube $P^4$ also leads to the valve casing and is in communication with the passage 34 leading to the channel way and the tube $N^4$ is in communication with the passage way 35 also leading to the channel way 23 and terminating just beyond the inlet end of the passage way 35.

The slide valve 24 is provided with a passage way 36 within one end thereof leading to the atmosphere and is adapted to communicate with the passage way 33 to permit the entrance of air to the latter whereby the loud pedal pneumatic T will be operated. Formed within the opposite end of the slide valve are passage ways 37 and 38, see Fig. 6, respectively, which are in communication with the atmosphere and are adapted to register with the passage ways 35 and 34, respectively, whereby the treble and bass pneumatics may be operated.

Attention is called to the fact that a channel 39 connects the passage way 38, as clearly shown in Figs. 5 and 6, while a groove 40 is located in line with the passage way 37 but disconnected therefrom for a purpose that will hereinafter appear.

From the foregoing it will be seen that the several expression devices controlled by the pneumatics N, P and T are placed under a unitary, manual, operable control in the valve 24 with its controlling lever 10 and may be selectively operated accordingly. It will be further seen that by the link connections described the indicator arm 7 is movable with both lever 10 and valve 24 and may be moved to follow the sinuous line 19 on the music sheet. In this manner inexperienced persons may operate the rolls correctly, as by a manual manipulation of the lever 10 the several expression mechanisms will be automatically actuated in accordance with the sinuosities of the line. Thus, by moving the upper end 10′ of the lever 10 to the right the indicator will move to the right and register with the loud expression along the line 19, and in turn the valve 24 will slide to the left, causing the opening 36 to register with the passageway 33 whereby air will be permitted to enter the loud pedal pneumatic, thereby operating the same. When, however, the upper end 10′ of the handle 10 is moved to the left, the indicator will register with the soft expression dots of the line 19 and the opening 37 will first register with the passage way 35 for permitting air to travel to the treble pneumatic which will be operated and then by moving the lever farther to the left the opening 38 will register with the passage way 34, thereby permitting air to enter the tube $P^4$ and bass pneumatic so that the latter will be operated. By reason of the grooves 39 and 40, any further movement of the lever to the left or pianissimo position of the line 19 will maintain the passages 35 and 34 open to permit air to enter both these passage ways at once whereby both the treble and the bass pneumatics may be jointly operated. When the bass and treble pneumatics are operated, it is obvious that the position of the slide valve 24 is such that the connection to the loud damper pneumatic is closed and thus prevented from action. The channel way 23 is provided with a felt packing 41 upon which travels the slide valve 24 to prevent any leakage of air into the passage ways 33, 34 and 35, when the valve has closed these passage ways.

When the slide valve is moved to a position where all of the passage ways within the valve casing are closed, the medium tone of the piano will be given and when it is desired the valve may be placed in this position and the indicator swung upon its pivot connection so that it will rest upon the neutral bracket 21 and then the operator may use the buttons N″, P″ and T″ in the usual manner for giving the usual expression to the music.

From the foregoing it is obvious that the mechanism forming the subject matter of the invention may be easily and readily applied to any player action using the solo or expression pneumatics and when applied to any player action it can be readily placed out of use so that the usual expression devices may be brought into play.

What I claim as new and desire to secure by Letters Patent is:

1. In a player piano comprising three pneumatic mechanisms for controlling the operation of the expression mechanism, of a valve casing, means of communication between the valve casing and pneumatic mechanisms, a valve movably mounted within said casing, said valve having a duct in one end thereof adapted to establish communication between the atmosphere and one of the pneumatic mechanisms whereby its movement will be effected, the opposite end of said valve having a pair of ducts arranged therein operating, on an appropriate movement of said valve to establish communication between the remaining pneumatic mechanisms and the atmosphere whereby their operation will be jointly effected and means for operating said valve.

2. In a player piano comprising a plurality of pneumatic mechanisms and a like plurality of expression mechanisms for producing treble, bass and forte pedal effects respectively, actuated by said pneumatics, of a valve casing, means of communication between the respective pneumatic mechanisms and the valve casing, a valve movably mounted within said valve casing, said valve having a duct in one part thereof and movably operable in one direction to establish communication between the atmosphere and the forte pedal actuating pneumatic to actuate the same, and in the opposite direction to prevent such actuation, said valve having an oppositely-disposed pair of ducts adapted to establish communication between the atmosphere and the treble and bass pneumatics respectively, said valve being further movable to selectively actuate either or both of said last mentioned pneumatics and prevent actuation of one when the other is selectively actuated; and a single manually operable means for moving said valve.

3. In a player piano, the combination of a plurality of independently operable pneumatic mechanisms, expression controlling devices, connecting actuating means between each of said mechanisms and each of said devices, and means to selectively actuate said pneumatic mechanisms, said means consisting of a valve casing having a channeled face and passage ways leading therefrom, a tube leading from each of said passage ways to each of said pneumatics, a movable valve resiliently supported in said channel way of the casing and having direct communication with the atmosphere and having also a series of passage ways corresponding to the passage ways in the casing, and means to actuate said valve.

4. In a player piano, the combination with a plurality of independently operable pneumatic mechanisms, expression controlling mechanisms actuated thereby, and a music roll having thereon an expression line to indicate expression effects to be produced in playing, an index pointer, a movable valve adapted to govern the selective actuation of each of said pneumatic mechanisms, manually operable means to actuate said valve, and connecting actuating devices between said valve and pointer, adapted to effect a movement of said pointer and an operation of said expression mechanisms to accord therewith.

5. In a player piano, a plurality of independent pneumatic mechanisms, expression controlling mechanisms actuated thereby, a perforated music roll having thereon a line indicating expression effects which said pneumatic mechanisms are adapted to produce, an index pointer movable over said line, a valvular device including a movable valve governing passage ways therein adapted to selectively establish communication between each pneumatic and the atmosphere, connecting actuating means between said valve and said index pointer, and a lever forming part of said actuating means.

6. In a player piano, a plurality of independent pneumatic mechanisms for controlling the operation of expression mechanisms, a music roll having thereon an expression guide line, an indicator movable to follow said line, a valve, passage ways therein leading to the atmosphere, means of communication between the valve and each pneumatic, and governed by said valve, connecting actuating means adapted to actuate said valve and indicator in unison, and a lever forming part of said actuating means, whereby said indicator may be made to follow the line and said valve be caused to selectively actuate the appropriate pneumatic to effect the results indicated by said line.

In witness whereof, I have hereunto set my hand this 14th day of May, A. D. 1918.

OTIS M. KENNEDY.

Copies of this patent may be obtained for five cents each, by addressing the "Commissioner of Patents, Washington, D. C."